No. 782,461. Patented February 14, 1905.

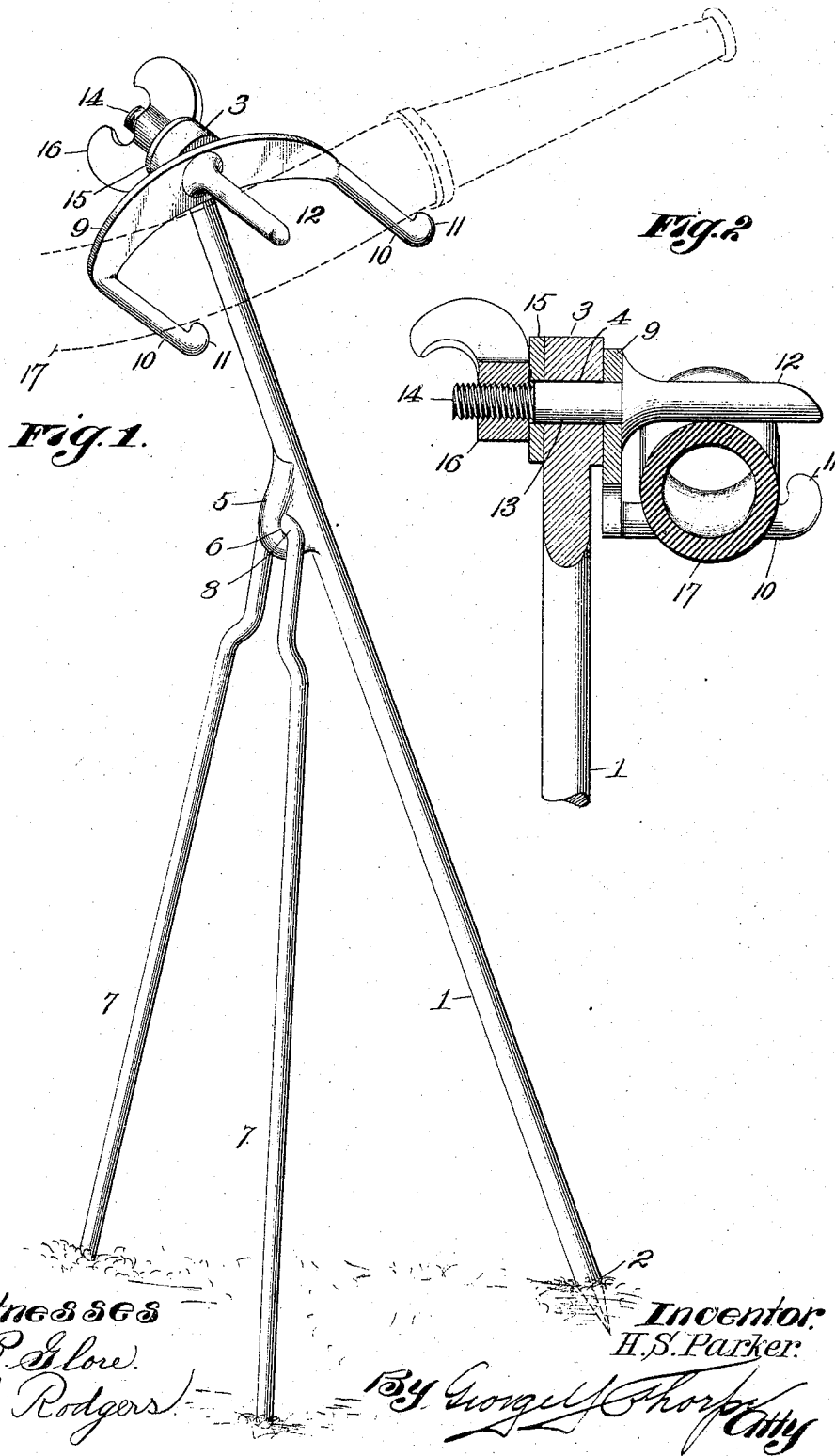

UNITED STATES PATENT OFFICE.

HENRY S. PARKER, OF EL RENO, OKLAHOMA TERRITORY, ASSIGNOR OF ONE-HALF TO JAMES F. MATTHEWS, OF EL RENO, OKLAHOMA TERRITORY.

LAWN-HOSE SUPPORT.

SPECIFICATION forming part of Letters Patent No. 782,461, dated February 14, 1905.

Application filed April 27, 1904. Serial No. 205,262.

*To all whom it may concern:*

Be it known that I, HENRY S. PARKER, a citizen of the United States, residing at El Reno, in the county of Canadian and Territory of Oklahoma, have invented certain new and useful Improvements in Lawn-Hose Supports, of which the following is a specification.

This invention relates to lawn-hose supports, and has for its object to produce a device of this character which is adjustable vertically to vary the height of the hose and by which the hose-nozzle can be held horizontally or at any desired angle to said position.

A further object is to produce a device of this character which performs its function efficiently and reliably and to which the hose may be easily and quickly attached or from which it can be easily and quickly removed.

A still further object is to produce a device of this character which can be instantly unfolded and set up in operative position or folded to inoperative position for storage or transportation.

A still further object is to produce a device of this character which is of simple, strong, durable, and cheap construction.

To these ends the invention consists in certain novel and peculiar features of construction and organization, as hereinafter described and claimed, and in order that it may be fully understood reference is to be had to the accompanying drawings, in which—

Figure 1 is a perspective view of a lawn-hose support embodying my invention and shown as arranged in operative position and as supporting the nozzle end of the hose, the latter being shown in dotted lines. Fig. 2 is an enlarged vertical section taken in the plane of the clamping-bolt.

In the said drawings, 1 designates a rod of any suitable length, preferably about three feet eight inches, having its lower end sharpened, as at 2, for embedment in the ground and its upper end in the form of a cylindrical head 3, with its opposite faces flattened, said head being provided with an axial hole 4. At a suitable distance from its upper end the head is formed with a lug 5, having a hole 6 extending parallel with hole 4.

A pair of downwardly-diverging legs 7 are formed, preferably by suitably bending a wire rod, as shown, the connecting or bridge portion 8 of the legs extending pivotally through hole 6, so that said legs may be swung toward or from rod 1, the lower end of the legs being adapted to rest upon the ground at some distance from the lower end of rod 1, so as to form, in effect, a tripod which will reliably support the hose, as hereinafter explained. By disposing the lower ends of the legs 7 at varying distances from the lower end of rod 1 the latter is caused to assume a position more or less approaching the perpendicular, so as to support the hose at varying distances from the ground.

The holder for the hose is constructed as follows: An arch-shaped plate 9 terminates at its lower ends in substantially horizontal arms 10, having their outer ends upturned, as at 11, to form hooks which will prevent the hose from accidentally slipping off the ends of said arms. 12 designates an arm projecting from plate 9 about midway its length and extending substantially parallel with arms 10, but in a plane which is above the latter when the plate occupies a substantially horizontal position. This arm 12 may be cast integral with the plate or soldered or otherwise rigidly secured thereto. If secured thereto as shown in the drawings, it is provided with a bolt consisting of smooth cylindrical portion 13 and the diametrically-smaller threaded portion 14. If the arm is not secured thereto, said bolt will be otherwise secured to or formed integral with plate 9. In either case the smooth portion of the bolt will pivotally engage hole 4 of head 3 and a washer 15. A clamping-nut, preferably a wing-nut, 16 will engage the threaded portion of the stem for the purpose of clamping the holder in a horizontal position or any angle thereto, the position which said holder occupies determining the direction in which the water from the hose shall be discharged.

To secure the hose 17 in operative position, it is bent slightly, so that it can be slipped between the arms 10 and 12, where it is reliably held, because the hooks prevent it from slipping off the ends of arms 10, and the fact that it is bent or kinked between said arms by arm 12 prevents longitudinal slippage. When water is passing through the hose, it presses in opposite directions against arms 10 and 12 so heavily that there is no chance of accidental dislocation. To vary the angle by turning the holder, the wing-nut is loosened, being again tightened to secure the holder in its new position.

From the above description it will be apparent that I have produced a lawn-hose holder embodying the features of advantage enumerated as desirable and which is obviously susceptible of modification without departing from the principle of construction involved.

Having thus described the invention, what I claim as new, and desire to secure by Letters Patent, is—

1. The combination with a suitable support adapted to rest on the ground, of a holder, consisting of a rotative plate pivoted to the support to move in a vertical plane and having at one side a pair of substantially horizontal arms to engage a hose, and an arm to engage the hose at its opposite side between the first-named arms, and means to secure the rotative plate with the engaged portion of the hose disposed horizontally or at any angle thereto.

2. The combination with a suitable support adapted to rest on the ground, of a holder consisting of a plate having a bolt extending horizontally through the upper end of the holder for pivotal operation of the plate in a vertical plane, and having arms projecting from its opposite side for engagement with opposite sides of a hose, and a nut mounted on said bolt for the purpose of clamping the plate with the engaged portion of the hose extending horizontally or at any angle thereto.

3. A lawn-hose support, consisting of a rod having its lower end pointed for embedment in the ground, and a pair of legs pivoted to said rod and also adapted to rest upon the ground and brace the rod, and a holder carried by the rod and consisting of a rotative plate having substantially horizontal arms to engage the hose at opposite sides, the arms at one side of the hose terminating in hook ends.

In testimony whereof I affix my signature in the presence of two witnesses.

HENRY S. PARKER.

Witnesses:
 OTTO A. SHUTTEE,
 SMITH TAYLOR.